United States Patent [19]

Behr

[11] Patent Number: 4,863,895

[45] Date of Patent: Sep. 5, 1989

[54] HONEYCOMB BODY AS CATALYST SUPPORT FOR CLEANING THE EXHAUST OF INTERNAL COMBUSTION ENGINES

[75] Inventor: Friedrich Behr, Krefeld, Fed. Rep. of Germany

[73] Assignee: Thyssen Edelstahlwerke AG, Krefeld, Fed. Rep. of Germany

[21] Appl. No.: 179,379

[22] Filed: Apr. 8, 1988

[30] Foreign Application Priority Data

Apr. 18, 1987 [DE] Fed. Rep. of Germany ....... 3713209

[51] Int. Cl.$^4$ .............................................. B01J 32/00
[52] U.S. Cl. ..................................... 502/439; 502/527
[58] Field of Search ............... 502/439, 527; 422/180; 428/116

[56] References Cited

. U.S. PATENT DOCUMENTS

| | | | |
|---|---|---|---|
| Re. 32,044 | 12/1985 | Atwood et al. ................ | 502/527 X |
| 4,448,828 | 5/1984 | Mochida et al. ................ | 428/116 X |
| 4,665,051 | 5/1987 | Nonnenmann .................. | 502/527 X |

*Primary Examiner*—W. J. Shine
*Attorney, Agent, or Firm*—Cushman, Darby & Cushman

[57] ABSTRACT

Honeycomb bodies for cleaning the exhaust gases of internal combustion engines function as carrier for a wash coat impregnated with a noble metal. The known honeycomb bodies exhibit square conduit cross sections with a cross-sectional area of approximately $1.1 \times 1.1$ mm$^2$. The small cross sections result in high flow resistances which are amplified even more by deposits of rather thick layers of wash coat in the corner areas. A considerable diminution of the flow resistances is achieved without reducing the amounts of harmful substances converted while saving honeycomb material if the honeycomb bodies (1) comprise individual conduits (2) which exhibit a ratio of width (3) to height (4) of 1.5 to 15.

4 Claims, 2 Drawing Sheets

HONEYCOMB BODY AS CATALYST SUPPORT FOR CLEANING THE EXHAUST OF INTERNAL COMBUSTION ENGINES

The invention is relative to honeycomb bodies for cleaning the exhaust gases of internal combustion engines. The honeycomb bodies function as carriers for coatings, especially as carriers for a wash coat impregnated with noble metal.

According to German utility model 73 02 106, foils are stamped in a corrugated manner for manufacturing honeycomb bodies from heating conductor material and are alternatingly wound or stacked with a smooth, unstamped foil to the body. The unstamped, smooth foil functions as a spacer. The disadvantage of this arrangement is the fact that approximately 20% of the effective foil surface functions as contact surface and is therefore not available for converting the harmful chemical substances. Trapezoidal conduits with an average width of approximately 1.1 mm and a free height of approximately 1.1 mm are formed hereby. After the conduits have been coated with a ceramic material (wash coat), the free conduit cross sections are approximately circular in shape because thicker layers of wash coat settle in the corners than on the free foil surfaces. The diameters of the conduit cross sections customary for use as catalyst carriers in motor vehicles are then approximately 1 mm after the wash coat has been applied.

The honeycomb bodies of ceramics with 400 cells/inch$^2$ predominantly customary today exhibit square conduit cross sections with $1.1 \times 1.1$ mm. The wash coat accumulation in the corners also results in this instance in a more circular cross section of the conduits with a diameter of approximately 1 mm.

DE-OS 27 59 559 suggests stamping the foil for catalyst carrier honeycomb bodies so that it is indented in an arrow-like manner. A smooth intermediary layer can be eliminated in the case of foil layers rotated through 180° with arrow directions which are therefore opposite in direction. The intersecting corrugation peaks assure the spacing. Independent measurements show that a sequence of large and small hydraulic diameters per conduit is created hereby although the cross sectional area per conduit remains constant. This results in considerably increased pressure losses in sum over the conduit length or, in the case of an increase of the cross sections of the corrugations, in the same pressure loss as in the catalyst carrier with intermediary layer and then, however, in reduced conversions of harmful chemical substances at the same catalyst carrier volume.

The invention has the problem of designing the cross-sectional shape of the conduits in such a manner that a greater ratio of conversion of harmful substances to pressure loss is achieved.

This problem is solved in a honeycomb body of the initially mentioned type in that the cross sections of the individual conduits exhibit a ratio of width to height of 1.5 to 15. It was surprisingly found that in the case of laminar flows like those which occur in the carriers, the designing of the conduit cross sections as a slot or rectangle or with an oval shape results in an up to 30% better, that is, greater ratio of the conversion of harmful substances to the pressure loss. The shape of the conduits results in a lesser wall area than in the honeycomb bodies according to the state of the art of the same size and also has the advantage, especially in honeycomb bodies of metal, that a lesser amount of foil is required.

If the honeycomb body consists of ceramics, the cross-sectional shape of the invention can be easily set by means of a suitable design of the extrusion tool.

The invention can be designed with advantage in detail as follows.

Favorable ratios of the conversion of harmful substances to the pressure loss with good stability of the honeycomb bodies are achieved if the width of the individual conduits is approximately 3 to 8 mm and the height of the individual conduits is 0.65 to 0.9 mm. Large cross-sectional widths have an adverse effect on the strength of the honeycomb bodies.

The honeycomb body consisting of metal foils in which a corrugated foil is held by a smooth, unstamped foil can be designed in such a manner that the corrugations with the height of the individual conduits in the corrugated foil are alternatingly stamped out of the corrugated foil, which is otherwise smooth, to both sides. The smooth foils then rest on the vertices of the stamped-out corrugations and the individual conduits have, in addition to the cross-sectional area with the width and height ratio of 1.5 to 15 associated therewith, the areas of the stamped-out corrugations.

In order to be able to save part of the amount of foil which was previously used as contact surface in metal-foil carriers, the invention suggests that the lateral limitation of the elongated conduit cross sections and the spacing of the foil layers be designed with the aid of corrugations indented in an arrow-like manner. The corrugation peaks of successive foil layers face in the same direction thereby but the arrow tips of the corrugation peaks of successive foil layers in opposite directions. In this manner, an almost rectangular conduit cross section is generated to which a smaller area of the corrugation of the following foil length is added. In this manner, only approximately 5 to 7% of the total foil surface functions as contact surface. The limitation of the width of the conduits was achieved thereby by the corrugation indented like arrows.

Instead of being designed with an arrow-like corrugation, the honeycomb body can also be designed with obliquely indented corrugations in such a manner that the corrugation peaks of each two foils resting on each other face in the same direction, namely vertical to the foil surface, and the direction of the oblique indentation of foils resting on each other in relation to the transverse foil direction is arranged at different angles. As a result of the different angles, the corrugations cross each other and function as spacers and lateral limitation of the elongated conduit cross sections.

In both embodiments, the foil layers resting on each other can be produced either by winding or by stacking them on top of each other.

In an especially advantageous embodiment the cross sections of the individual conduits are larger in the central surface area of the cross-sectional area of the honeycomb than the cross sections of the individual conduits in their outer area. Since the flow of fumes and of combustion gases exhibits a temperature profile with a higher temperature in the middle of the exhaust pipe and the diffusion constants of the harmful substances rise with the temperature but the density of the gas drops, an enlargement of the conduit cross sections has an advantageous effect in the inner area of the catalyst carrier on the pressure loss without lowering the chemical conversion. Moreover, the foil requirement is considerably reduced by this measure. Such a honeycomb body can be easily manufactured by winding the foils. A very small radius of curvature is present at the start of the winding of the foils, which radius decreases as the winding progresses. As a result of the smaller radius of curvature, the corrugations indented obliquely or in an arrow-like manner rleax more at the start than at the outer circumference of the body. In this manner, larger conduit cross sections and therewith greater hydraulic diameters are achieved in the inner area of the total cross section of the wound bodies than in their outer areas.

The invention will now be explained with reference made to an embodiment.

Figure 1:
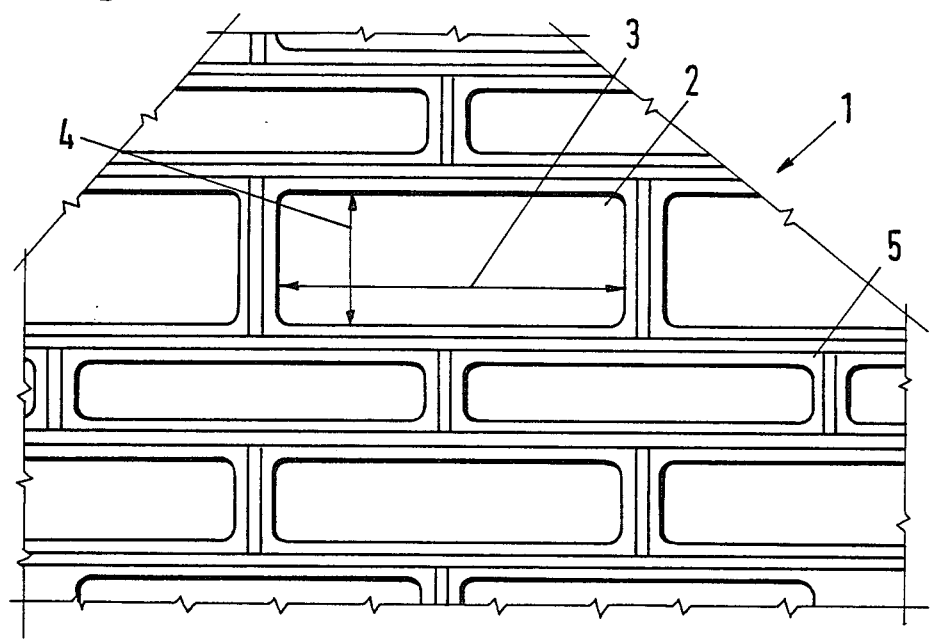
FIG. 1 shows a schematic view of a section of the front surface of a honeycomb body made of ceramics.

A honeycomb body 1 for cleaning the exhaust of internal combustion engines functions as a catalyst carrier. The cross sections of the individual conduits exhibit a ratio of width 3 to height 4 of 1.5 to 15. The width 3 of the individual conduits 2 is approximately 3 to 8 mm thereby and the height 4 of the individual conduits 0.65 to 0.9 mm. The ceramic honeycomb body of FIG. 1 is manufactured by extrusion. A coating of a ceramic material (wash coat) 5 has been applied to the walls of honeycomb body 1.

Figure 2:
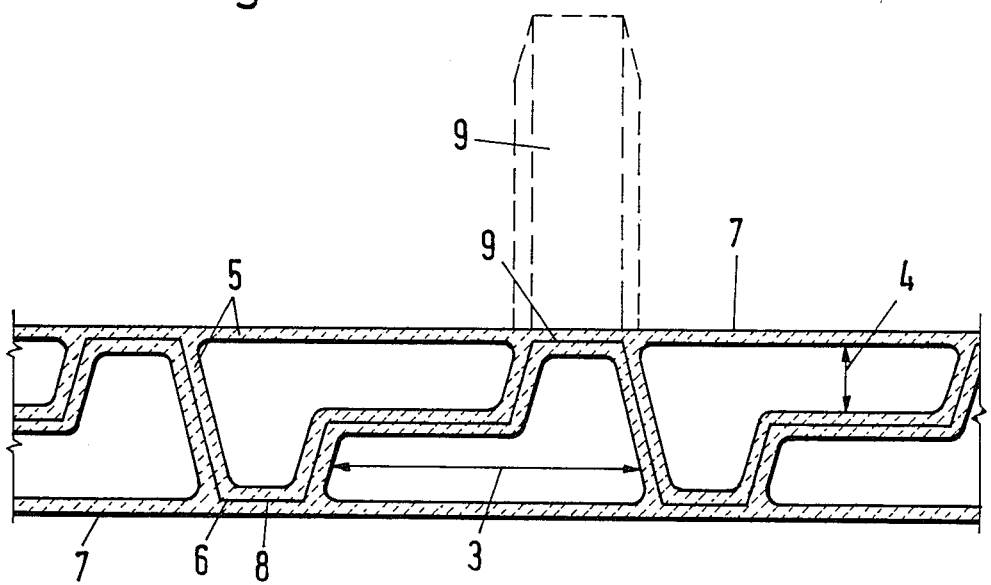
FIG. 2 shows a schematic view of a section of two foil layers of a honeycomb body consisting of metal foils with a smooth intermediary layer.

A corrugated foil 6 is held by a smooth, unstamped foil 7 in the two foil layers of a honeycomb body of metal foils shown in FIG. 2 from which the entire honeycomb body 1 is built. In corrugated foil 6, corrugations 8,9 with height 4 of the conduits are stamped in alternating fashion from foil 6 in the direction of both sides. The individual conduits 7 exhibit additional volumes of the size of corrugations 8,9 in this embodiment.

Figure 3:
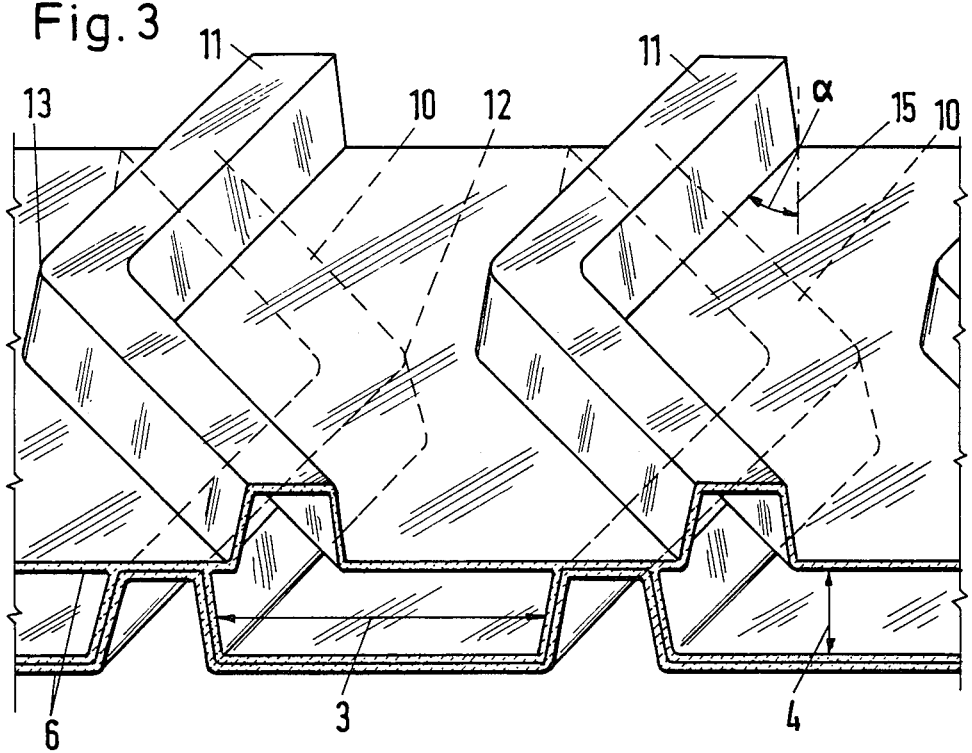
FIG. 3 shows another formation of two foil layers with metal foils without intermediary layer.

In the embodiment of the sheets from which the honeycomb body is built according to FIG. 3, corrugation peaks 10,11 of each two foils resting on one another are stamped out in the same direction, namely, vertical to the surface of the foils (upward in the drawing). The corrugations are designed in an arrow-like manner and arrow tips 12,13 of foils 6 resting on each other face in opposite directions. In this embodiment too, the volume of corrugations 10,11 is added to the volume of the rectangular individual conduit with width 3 and height 4.

Figure 4:
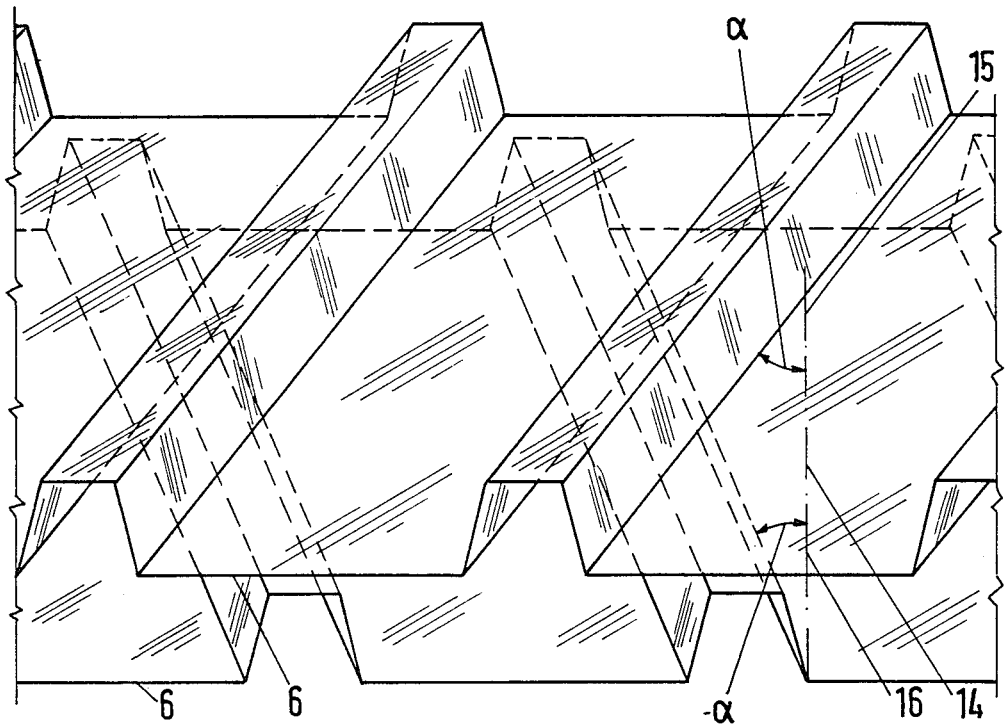
FIG. 4 shows another embodiment of two foil layers with metal foils without intermediary layer.

According to FIG. 4, in the case of metal foils with obliquely indented corrugations the corrugations are likewise stamped out of the foils in one direction, upward in the drawing. The directions of the oblique indentation of the two foils 6 resting on one another in relation to the transverse foil direction 14, α 15 and −α 16, are different. In the embodiment of FIG. 4, they differ by their sign.

The designing of the cross sections of individual conduits 2 in elongated form achieves a large, free cross section with low flow resistance without adversely affecting the amount of harmful substances converted in spite of a coating with wash coat 5. In tests with a metal body with arrow-shaped design of the corrugations in accordance with FIG. 3, the following values were obtained vis-a-vis a metal body with a smooth intermediary layer in which the corrugation was executed according to the state of the art with small, almost circular conduit cross sections of approximately 1 mm$^2$:

| | |
|---|---|
| Stamping height of the corrugations | 0.85 mm arrow indentations with 6° setting angle (α) |
| Free conduit height | 0.72 mm |
| Free conduit width | 5 mm |
| Pressure loss | reduced by 15% |
| Chemical conversion | improved |
| Amount of foil per catalyst volume | reduced by 30% |

The body wound from the foils in accordance with FIG. 3 exhibited larger conduit cross sections and therewith larger hydraulic diameters in the inner area of the total cross section of the wound body (not shown) than on its outside.

I claim:

1. In a coated honeycomb with channels as catalyst support for purifying the exhaust gases produced by internal combustion engines, consisting of at least two superposed corrugated and wound metal foils, at least one of which is arrow-shaped, the improvement wherein the cross-sections of the channels (2) are substantially trapezoidal and exhibit a relation of the mean width (3) towards the height (4) of 1.5 to 15.

2. A honeycomb according to claim 1 in which the mean width (3) of the channels (2) is 3 to 8 mm and the height of the channels (2) is 0.65 to 0.9 mm.

3. A honeycomb according to claim 1 or claim 2 consisting of arrow-shaped corrugated metal foils in which the crests (10,11) of every two superposed foils (6) point in the same direction, namely vertically towards the surfaces of the foils (6), and the arrow-shaped points (12,13) of the corrugated structure of the foils (6) lying on one another point in the opposite direction.

4. A honeycomb according to claim 1 or claim 2 in which the cross-sections of the channels (2) in the central surface area of the honeycomb cross-section surface are larger than the cross-section of the channels (2) in the outer surface area of the honeycomb cross-section surface.

* * * * *